United States Patent [19]

Shelef

[11] 4,288,241
[45] Sep. 8, 1981

[54] METHOD AND APPARATUS FOR COMPOSTING SLUDGE

[76] Inventor: Gedaliahu Shelef, 9 Ayalon St., Haifi, Israel

[21] Appl. No.: 60,989

[22] Filed: Jul. 26, 1979

[30] Foreign Application Priority Data

Aug. 22, 1978 [BR] Brazil .................. PI7805441

[51] Int. Cl.³ .................................... C05F 11/08
[52] U.S. Cl. .................................... 71/9; 71/12; 71/13; 210/620
[58] Field of Search .................. 71/8, 9, 12, 13; 210/620, 621, 623

[56] References Cited

U.S. PATENT DOCUMENTS

| | | | |
|---|---|---|---|
| 2,798,800 | 7/1957 | Geraghty et al. | 71/9 |
| 3,314,765 | 4/1967 | Abson et al. | 71/9 X |
| 3,579,320 | 5/1971 | Pesses | 71/9 |
| 3,761,237 | 9/1973 | Jeffreys | 71/9 |
| 4,050,917 | 9/1977 | Varro | 71/9 |

FOREIGN PATENT DOCUMENTS

| | | | |
|---|---|---|---|
| 670800 | 9/1963 | Canada | 71/9 |
| 2323565 | 12/1973 | Fed. Rep. of Germany | 71/9 |
| 2325199 | 12/1974 | Fed. Rep. of Germany | 71/9 |
| 2508321 | 7/1976 | Fed. Rep. of Germany | 71/9 |
| 2520640 | 11/1976 | Fed. Rep. of Germany | 71/9 |
| 2744026 | 4/1979 | Fed. Rep. of Germany | 71/13 |

OTHER PUBLICATIONS

G. Mattock, "New Processes of Waste Water Treatment and Recovery", 1978, pp. 202-204.

Primary Examiner—S. Leon Bashore
Assistant Examiner—Michael L. Goldman
Attorney, Agent, or Firm—Lane, Aitken, Ziems, Kice & Kananen

[57] ABSTRACT

Sludge is composted by arranging the sludge in a pile over a conduit and air is forced into the pile in spaced time intervals and air is drawn from the pile into the conduit in alternate time intervals.

The perforated conduits are adapted to be placed under and extend the length of two windrow compost piles. A reversible blower is connected to blow air to and withdraw air from each of the conduits. The blower is timed and controlled to blow air from a first pile through the conduits and into a second pile in spaced time intervals and in alternate time intervals to withdraw air from the second pile through the conduits and into the first pile.

2 Claims, 2 Drawing Figures

METHOD AND APPARATUS FOR COMPOSTING SLUDGE

This invention relates to a method and apparatus for composting sludge and, more particularly, to an improved method and apparatus for the windrow-type of compositing.

In the composting of sludge, it is important that the proper moisture content be maintained in the sludge. When the sludge is too wet, the composting process will become anaerobic, which is substantially slower in decaying the sludge into compost. The sludge should not be too dry because the bacteria requires moisture to effect the decaying process which results in the turning of the sludge into compost.

Sludge is normally about ninety percent moisture. It has been proposed to use a windrow technique to compost the sludge in which the sludge is arranged in long piles or windrows over perforated conduits and air is forced into the piles by means of the perforated conduits to dry the sludge. However, in this process, the drying is faster in the area where the air is forced into the pile and the nonuniform drying makes it difficult to maintain all of the pile with optimum moisture content.

SUMMARY OF THE PRESENT INVENTION

In accordance with the present invention, the problem of nonuniform drying is overcome by cyclically reversing the direction of the air flow through the perforated conduit and through the pile so that air is alternately forced into the pile from the conduit and drawn from the pile into the conduit causing air to be drawn from the exterior surface of the pile into the pile. The pile is initially formed of a mixture of dried compost and wet sludge in order to obtain a moisture content of 45-70 percent moisture. Alternatively, the wet sludge may be mixed with municipal solid waste (garbage) or part municipal solid waste and part dried compost to obtain the 45-70 percent moisture content. Wet sludge containing about ninety percent moisture is added to the pile as needed as the compositing proceeds to maintain the moisture content in the optimum range of 45-70 percent moisture. With this moisture content being maintained, the thermophilic nature of the composting process will cause the temperature of the pile to be raised to 60°-65° C. which will pasteurize the material in the pile or, in other words, kill the pathogens contained therein.

DESCRIPTION OF THE PREFERRED EMBODIMENTS

Figure 1:
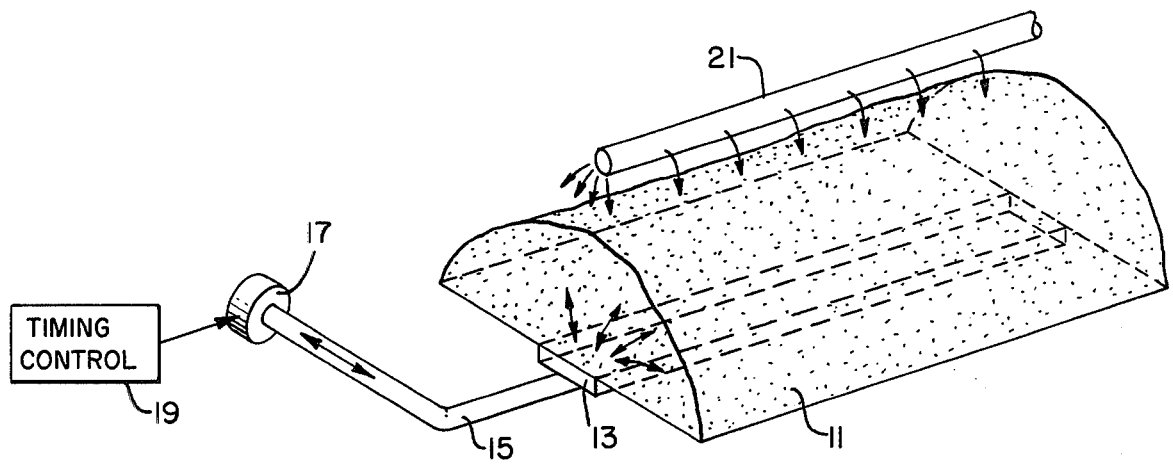
FIG. 1 is a schematic illustration of one embodiment of the invention.

As shown in FIG. 1, dried compost is mixed with wet sludge to form an elongated pile or windrow 11 so that it contains 45-70 percent moisture. Alternatively, instead of dried compost, municipal solid waste can be mixed with the sludge or partly dried compost and part municipal wolid waste can be mixed with the sludge in amounts to provide the 45-70 percent moisture mixture. The pile 11 is formed over an elongated perforated conduit 13 which is connected by means of an air pipe 15 to a two-way blower 17. The blower 17 is controlled by timing control 19 to alternately blow air into and draw air from the conduit 13 so that air is blown from the conduit into the pile 11 in spaced time intervals, while in alternate time intervals air is drawn back from the pile into the conduit 13, drawing air from over the upper exterior surface of the pile 11 into the pile 11. The reversal of the direction of air flow through the pile 11 in alternate cycles promotes uniform drying of the pile and eliminates excessive drying of the pile at the point where the air is entering the pile either at the conduit 13 in the case of air being blown into the pile from the conduit and at the surface of the pile 11 in the case where air is drawn through the pile into the conduit.

As the pile is dried, additional sludge is added to the pile 11 from the sludge conveyor pipe 21 and mixed with the material in the pile 11 to maintain the moisture content throughout the pile in the range of 45 to 70 percent.

The composting process with this moisture content raises the temperature of the pile to the range of 60° to 65° C. which pasteurizes the material in the pile or, in other words, kills the pathogens therein.

Figure 2:
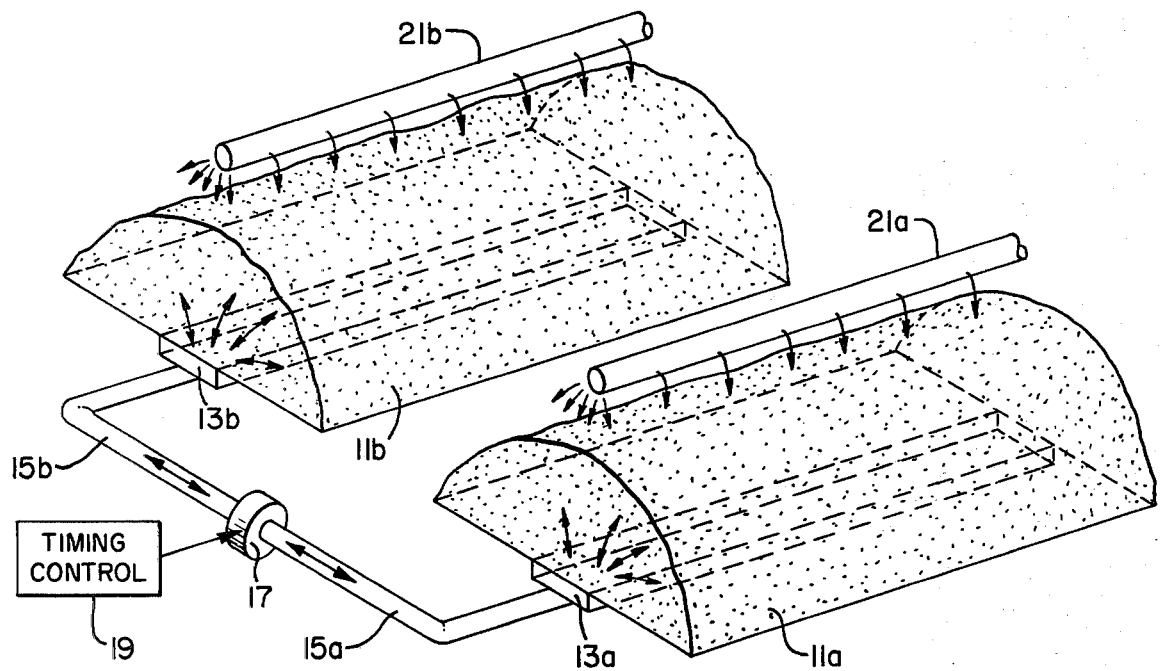
FIG. 2 is a schematic illustration of an alternative embodiment of the invention.

In the alternative embodiment in FIG. 2, the reversible blower 17 is connected by air pipes 15a and 15b between two conduits 13a and 13b, each of which is like the conduit 13 shown in FIG. 1. The blower 17 is controlled by timing control 19 like that shown in FIG. 1. The conduits 13a and 13b are positioned beneath compost piles 11a and 11b, respectively, formed in the same manner as the pipe 11 in FIG. 1. Also, in FIG. 1, additional wet sludge is added to the piles by conveyor pipes 21a and 21b as the piles dry to maintain the moisture content in the range of 45 to 70 percent. In the arrangement shown in FIG. 2, when the blower 17 is blowing air through the conduit into one pile, it draws air through the alternate pile so that the reversible blower is operating to dry two compost piles at one time.

Thus, the present invention provides a system for maintaining uniform drying of compost piles containing sludge and also maintaining optimum moisture content in the compost piles. As a result, the sludge is turned into usable compost fertilizer in a shorter period of time with minimum cost and with minimum adverse environmental effects.

The embodiments of the invention described above are intended to be exemplary and those with ordinary skill in the art will be able to make modifications and variations without departing from the spirit and scope of the appended claims, all such variations and modifications falling within the scope of the claims.

I claim:

1. A method of composting sludge comprising arranging the sludge into first and second windrows extending lengthwise over first and second elongated, perforated conduits, respectively, drawing air from said first windrow into said first perforated conduit and forcing the air drawn from said first windrow into said second windrow through said second conduit in spaced time intervals and in alternate intervals drawing the air from the second windrow into the second conduit and forcing the air drawn from said second windrow into said first windrow through said first conduit.

2. A method of composting sludge as recited in claim 6, further comprising initially constituting said windrow to contain 45 to 70 percent moisture and adding wet sludge to said windrow as said windrow is dried to maintain the moisture content in the range of 45 to 70 percent.

* * * * *